(12) United States Patent
Romary et al.

(10) Patent No.: US 6,481,165 B1
(45) Date of Patent: Nov. 19, 2002

(54) APPARATUS AND METHOD FOR TRANSPORTING AND FOR SECURING A BUILDING TO A FOUNDATION

(75) Inventors: Edward J. Romary, Fort Wayne, IN (US); Robert W. Meyers, Fort Wayne, IN (US)

(73) Assignee: Romary Associates, Inc., Fort Wayne, IN (US)

( * ) Notice: Subject to any disclaimer, the term of this patent is extended or adjusted under 35 U.S.C. 154(b) by 0 days.

(21) Appl. No.: 09/648,899

(22) Filed: Aug. 25, 2000

(51) Int. Cl.[7] .................................................. E04H 9/14
(52) U.S. Cl. ......................... 52/122.1; 52/143; 52/148; 52/23; 52/146; 52/157
(58) Field of Search ..................... 52/148, 23, 293.2, 52/295, 92.2, 677, 79.9, 7, 29, 223.4, 243.1, 143

(56) References Cited

U.S. PATENT DOCUMENTS

| | | | |
|---|---|---|---|
| 3,335,531 A | | 8/1967 | Grimelli et al. |
| 3,726,054 A | * | 4/1973 | Anderson et al. ............. 52/148 |
| 3,802,138 A | * | 4/1974 | McCarter ..................... 52/148 |
| 3,943,670 A | * | 3/1976 | Miller ........................... 52/23 |
| 4,226,061 A | | 10/1980 | Day |
| 4,321,776 A | | 3/1982 | Delight |
| 4,644,708 A | * | 2/1987 | Baudot et al. ................ 52/79.9 |
| 5,193,325 A | | 3/1993 | Allison |
| 5,384,993 A | | 1/1995 | Phillips |
| 5,448,861 A | * | 9/1995 | Lawson ....................... 52/92.2 |
| 5,531,054 A | | 7/1996 | Ramirez |
| 5,664,389 A | | 9/1997 | Williams |
| 5,687,512 A | * | 11/1997 | Spoozak et al. ............... 52/23 |
| 5,782,048 A | * | 7/1998 | Ramirez ....................... 52/295 |
| 5,881,499 A | * | 3/1999 | Luzzi ............................ 52/23 |
| 5,950,373 A | * | 9/1999 | von Hoff et al. ............. 52/79.5 |
| 6,138,421 A | * | 10/2000 | Grigsby ...................... 52/293.2 |
| 6,161,339 A | * | 12/2000 | Cornett, Sr. et al. ............ 52/23 |
| 6,219,973 B1 | * | 4/2001 | Lafferty ........................ 52/23 |

* cited by examiner

Primary Examiner—Carl D. Friedman
Assistant Examiner—Basil Katcheves
(74) Attorney, Agent, or Firm—George Pappas

(57) ABSTRACT

An apparatus and method for transporting a manufactured building to a desired location and securing it to a foundation. The apparatus includes elongate members extending through the exterior walls and secured to upper beams above the upper building plate and lower beams below the building lower plate. The elongate members are placed in tension compressing and holding together the wall plates and studs. An eyelet is secured to each upper beam and/or elongate member. The building is lifted using cables secured to the eyelets. The lower beam is selectively detachably attachable to the transporting trailer for rigidly securing the building thereto. After placing the building on a foundation, the lower beams are also selectively attachable to the foundation for securing the building thereto.

23 Claims, 3 Drawing Sheets

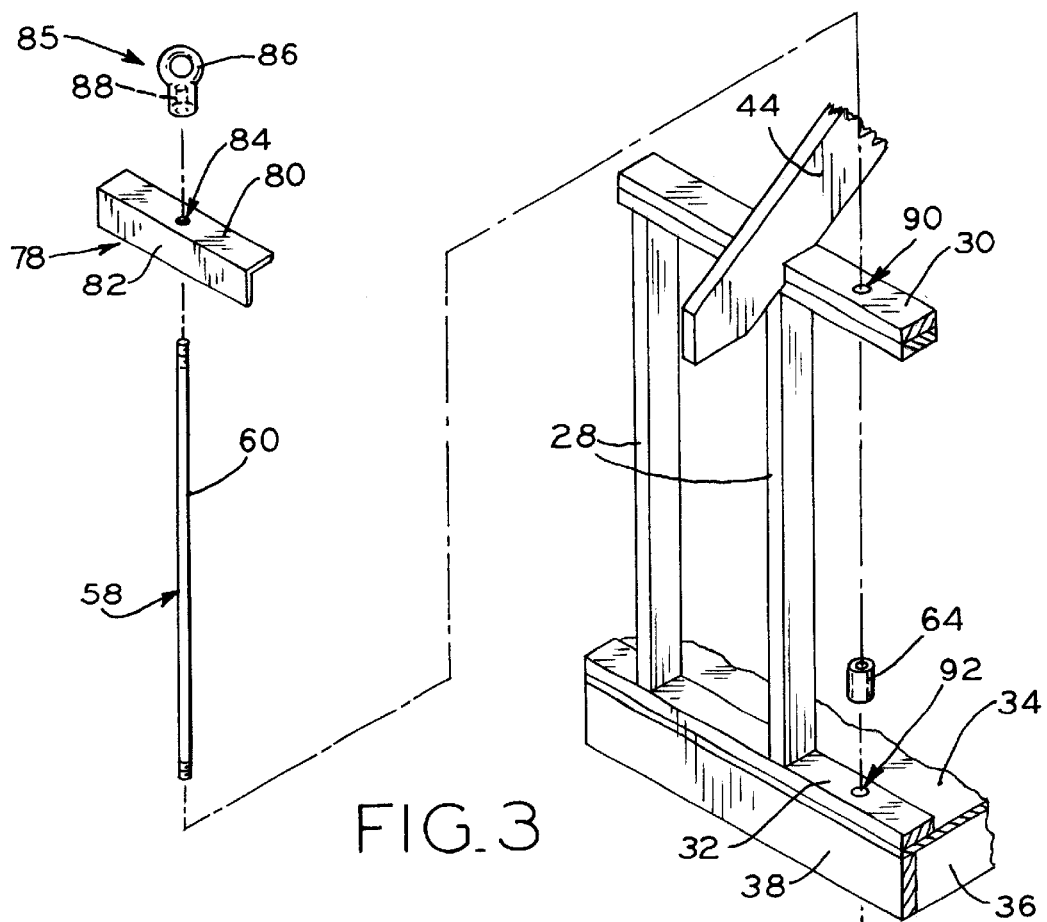
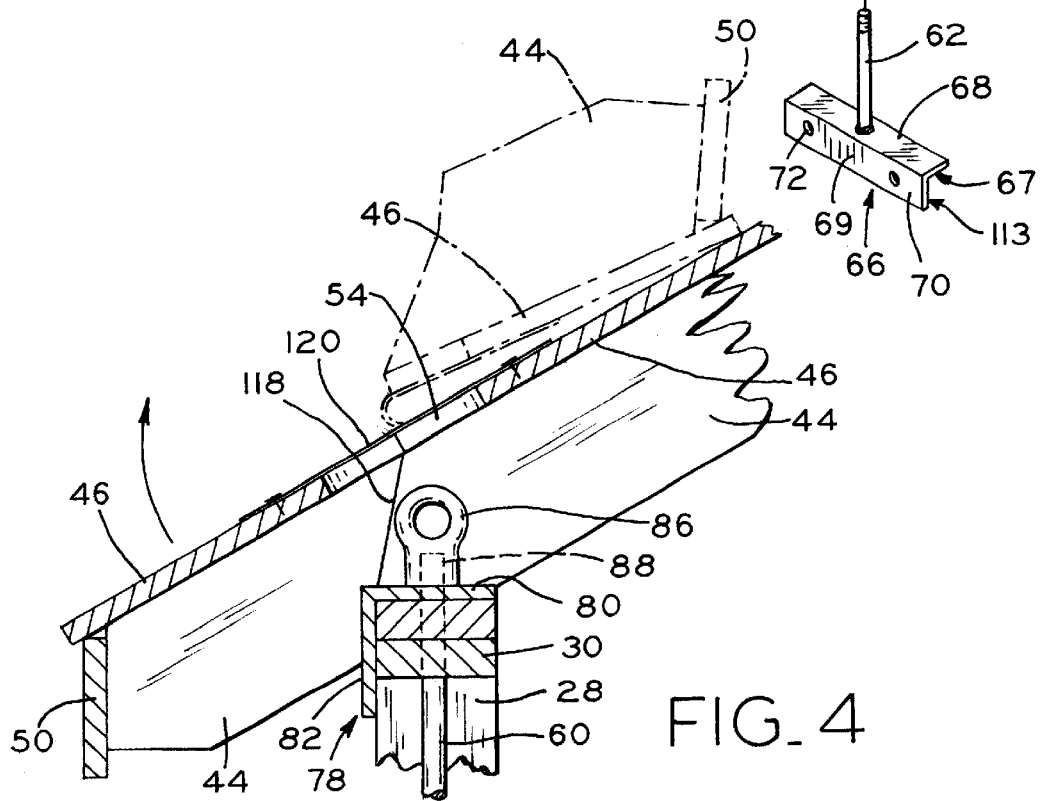

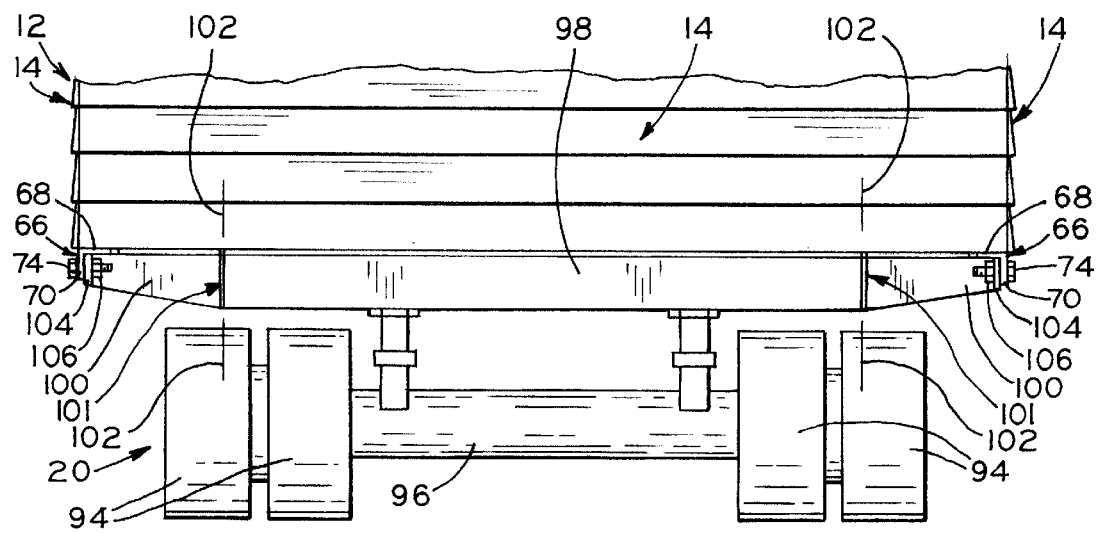
FIG_5
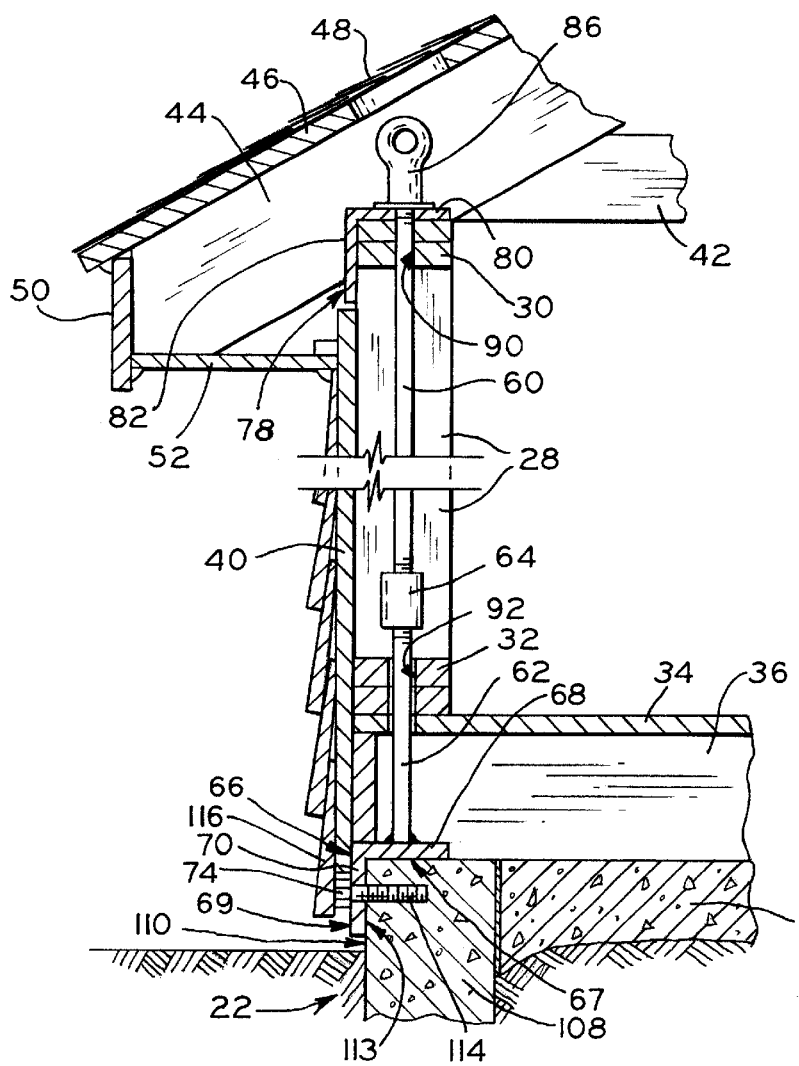
FIG_6

APPARATUS AND METHOD FOR TRANSPORTING AND FOR SECURING A BUILDING TO A FOUNDATION

TECHNICAL FIELD

The present invention relates to the technical field of transporting buildings such as manufactured houses and offices from the manufacturing facility to a desired location or site and the placement and securing of the building on a foundation. More particularly, the present invention relates to an apparatus integrated in the exterior walls of the building with which the building may be lifted, secured to a transporting vehicle such as a trailer, and secured to a building foundation.

BACKGROUND OF THE INVENTION

Manufactured houses, apartments and office buildings have been known and now used for decades. Such buildings are made at manufacturing facilities and are, thereafter, transported on large trailers to the desired location. Although these buildings are manufactured with wood frame (2×4 or 2×6 wall studs and plates, etc.), because they are manufactured in an assembly line type operation, out of the weather and within large manufacturing facilities, there is a significant reduction in manufacturing costs. However, because the building must be transported to its desired location or site, during transport, severe vibrations are encountered which can loosen or diminish the integrity of the building. Additionally, because of such vibrations and/or swaying of the structure during transport, rigid materials such as drywall or plaster are avoided on the interior walls since they will inevitably crack and require repair. Rather, the walls are typically finished with panels made of wood or other materials and the seams therebetween are covered with batten strips. In this manner, sufficient flexibility is provided so that the structure remains intact and so that visible wall cracks are prevented during transport. Unfortunately, this type of wall finish is typically undesirable thereby reducing the potential market value of the building.

In addition to the foregoing drawbacks, manufactured houses and buildings have also become known for their inability to withstand severe storms and weather. This is typically because once transported to the site, the building can not be properly secured to the foundation. Therefore, severe winds tend to more easily blow over a manufactured house or building as compared to a traditionally built house or building.

Various attempts have previously been made to address the foregoing described shortcomings and drawbacks. For example, U.S. Pat. No. 5,193,325 discloses incorporating load bearing structures into a housing unit for lifting and transporting. Additionally, U.S. Pat. No. 5,531,054; U.S. Pat. No. 3,335,531; U.S. Pat. No. 4,321,776; U.S. Pat. No. 5,664,389; U.S. Pat. No. 5,384,993; U.S. Pat. No. 4,226,061; and, U.S. Pat. No. 5,448,861 disclose various structures for tieing down a building made of wood frame or other construction to a foundation.

Although attempts have been made at addressing various prior needs for transporting manufactured buildings and for securing buildings to foundations they fall short of effectively and economically addressing the foregoing described needs. Accordingly, it has been discovered that an overall system including an apparatus and method is needed for lifting and transporting a manufactured building while retaining the structure rigidly secure and for, thereafter, properly securing the building to a foundation.

SUMMARY OF THE INVENTION

The object of the present invention is to provide a new and improved apparatus and method for use with manufactured buildings whereby the building may readily easily and efficiently be lifted for placing on a transportation vehicle, for securing the building to the vehicle and, after transport, for lifting the building and placing on a foundation and for securing the building to the foundation.

Briefly, the present invention is directed to an apparatus and method for lifting buildings of wood frame and having exterior walls made of vertical studs and horizontal upper and lower plates. Wood beams, typically 2×4 or larger, extend between the exterior walls forming the floor and ceiling frames. The apparatus is further adapted for securing the building to a foundation which is typically made of poured concrete or cinder blocks. The foundation has a bearing upper surface and a vertical exterior or outer wall.

The apparatus includes a plurality of elongate members such as threaded rod extending vertically through the building exterior walls between the wall studs. A lower beam is provided below the lower wall plate and/or below the floor joists and is attached to each of the respective elongate members. An upper beam is provided over the upper plates and is attached to each of the respective elongate members. A lift element, preferably an eyelet, is threadingly received on and thus attached to each of the elongate members. By threading the eyelet onto the elongate member or threaded rod, the upper and lower beams are forced toward one another placing the elongate member in tension and compressing or forcing the upper and lower plates toward the wall studs. In this manner, the upper and lower wall plates and/or the floor joists are sandwiched and retained rigidly together between the upper and lower beams. For lifting the building, crane cables need only be attached to the eyelets of the apparatus and the building lifted therewith for placement onto a transportation vehicle or a foundation.

Preferably, each of the lower and upper beams are steel angles having two legs with one leg being generally coplanar with the 2×4 plates and the other being coplanar with the building wall. This provides significant stiffening of the structure when the beams are compressed or forced toward one another. Additionally, when the building is placed on a foundation, the steel angle functioning as a lower beam is placed such that its vertical leg is coplanar and adjacent to the foundation outer wall. Fasteners such as screws may then be inserted through holes on the angle leg and into aligned bores in the foundation thereby efficiently and rigidly securing the apparatus and building onto the foundation.

Further yet, when transporting the building, after placing the building on a transportation vehicle such as a trailer, the steel angle vertical leg is adapted to be located adjacent pivotable trailer outriggers. The angle leg is detachably attachable to the trailer outriggers with fasteners such as screws or bolts extending through the angle leg holes and into the outriggers. In this manner, the building is also efficiently and rigidly secured onto the trailer during transport thereby generally eliminating a need for securing the building with straps and chains. Very advantageously, however, in view of the upper and lower beams being compressed or forced toward one another, the building walls are more capable of withstanding the vibrations and other forces experienced during transport, thereby generally preventing any cracks from occurring in the building interior finished walls which may be made of drywall or other similar stiff materials.

In one form thereof, the present invention is directed to an apparatus for lifting a building having walls made of vertical studs and horizontal upper and lower plates and for securing the building to a foundation having an outer wall. The apparatus includes a plurality of elongate members extending vertically through one or more of the building exterior walls. A plurality of lower beams are attached to one or more elongate members below the lower wall plate. A plurality of upper beams are each attached to one or more elongate members above the upper wall plate. A lift element is attached to a least one of the elongate members or upper beams whereby the building can be lifted. The lower beam includes a leg extending adjacent the foundation outer wall and a fastener is provided for attaching the leg to the foundation outer wall.

In one form thereof, the present invention is directed to an apparatus for lifting a building having walls made of vertical studs and horizontal upper and lower plates. A plurality of elongate members extend vertically through one or more of the building walls. A plurality of lower beams are each attached to one or more elongate members and are located generally below the lower wall plate. A plurality of upper beams are each attached to one or more elongate members and are located generally above the upper wall plate. A lift element is attached to at least one of the elongate members or upper beams whereby the building can be lifted.

In one form thereof, the present invention is directed to an apparatus for securing a building having walls made of vertical studs and horizontal upper and lower plates to a foundation having an outer wall. The apparatus includes a plurality of elongate members extending vertically through one or more of the building walls. A plurality of lower beams are each attached to one or more elongate members and are located generally below the lower wall plate. A plurality of upper beams are each attached to one or more elongate members and are located generally above the upper wall plate. The lower beam includes a leg extending adjacent to foundation outer wall. A fastener is provided for attaching the leg to the foundation outer wall.

In one form thereof, the present invention is directed to a method of transporting a building having walls made of vertical studs and horizontal upper and lower plates to a foundation having an outer wall. The method uses an apparatus including elongate members extending vertically through one or more of the building walls, a plurality of lower beams attached to one or more elongate members and located generally vertically below the lower plate, a plurality of upper beams attached to one or more elongate members and located generally above the upper wall plate, and a lift element attached to at least one of the elongate members or upper beams. The method includes the steps of lifting the building from the lift elements and placing the building onto a transporting vehicle, transporting the building with the vehicle to a desired location and, lifting the building from the lift elements off of the vehicle and placing the building onto a foundation.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein:

FIG. 3 is a perspective exploded view of an apparatus constructed in accordance with the principles of the present invention and showing the assembly thereof within a building exterior wall;

FIG. 4 is partial cross-sectional view showing the upper portion of an apparatus constructed in accordance with the principles of the present invention and, also showing in dash lines the building roof eave folded over on top of the roof for transporting the building;

FIG. 5 is a rear view of a building incorporating apparatus according to the present a invention and placed on a trailer for transport, and showing the apparatus lower beams attached to the trailer; and, FIG. 6 is a cross-sectional view similar to FIG. 2 but wherein the building has been placed on and secured to a foundation with the apparatus and the building roof completed.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF THE PREFERRED EMBODIMENTS

Figure 1:
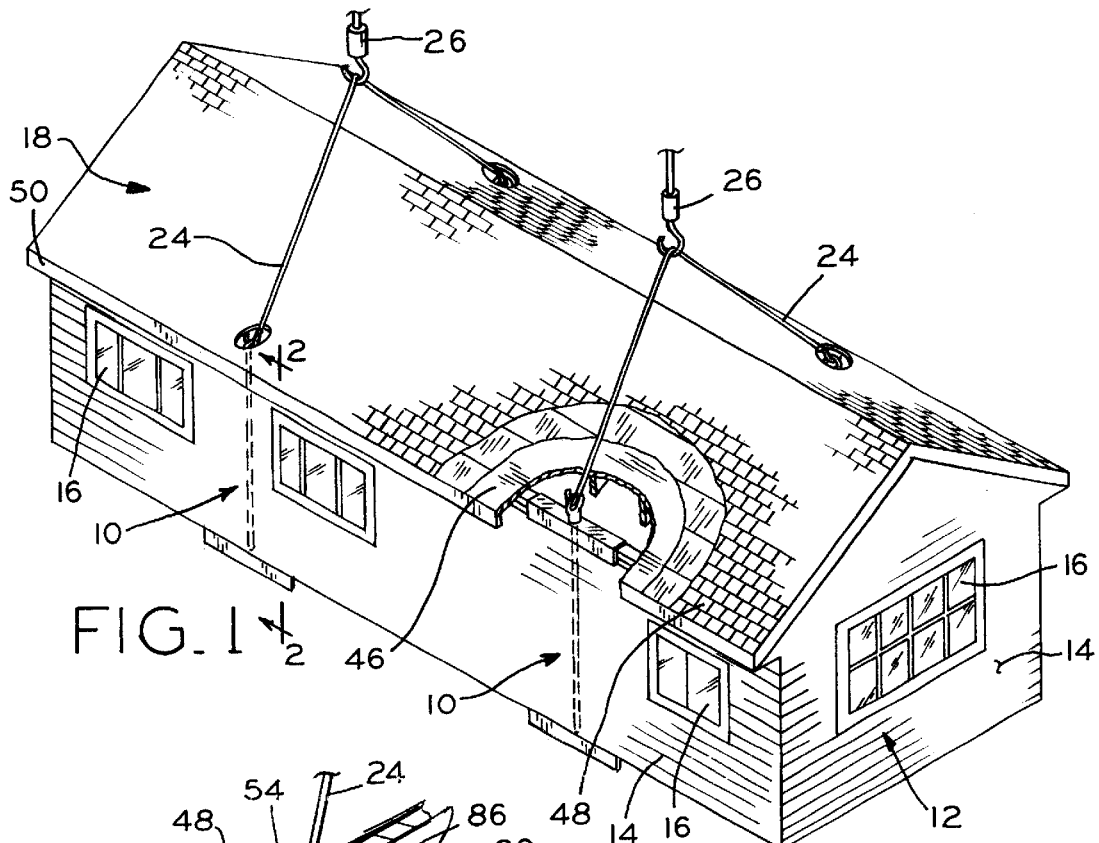
FIG. 1 is a perspective view of a building being lifted and which incorporates apparatus constructed in accordance with the principles of the present invention.

Referring initially to FIG. 1, an apparatus constructed in accordance with the principles of the present invention is shown and generally designated by the numeral 10 and is incorporated into a building 12. Building 12, as shown, includes exterior walls 14, windows 16 and a roof 18. It is noted that as used herein "building" is intended to mean any building unit such a house, apartment, office, etc., or a section or portion thereof which has been manufactured using vertical studs and horizontal plates as more fully described hereinbelow and which requires delivery thereof from the manufacturing facility to a final location or destination. In this regard, although exterior walls 14 as shown are covered with siding and intended to be exposed to the weather, when building 12 is a module or unit of a larger structure or building, the walls 14 could actually be intended for and used as interior walls. Thus, as used herein, "exterior walls" is intended to mean the outermost walls of a building or unit wherein the apparatus 10 are placed or incorporated.

As depicted in FIG. 1, after manufacturing, building 12 is intended to be liftable for the purpose of placing on a transporting vehicle such as a trailer 20 for transporting to and placement on a foundation such as that shown and depicted by the numeral 22. For lifting, one or more cables 24 may be attached to the apparatus 10 and, using crane hooks 26 and a crane or other machinery (not shown), building 12 can selectively be lifted and lowered as desired.

Figure 2:
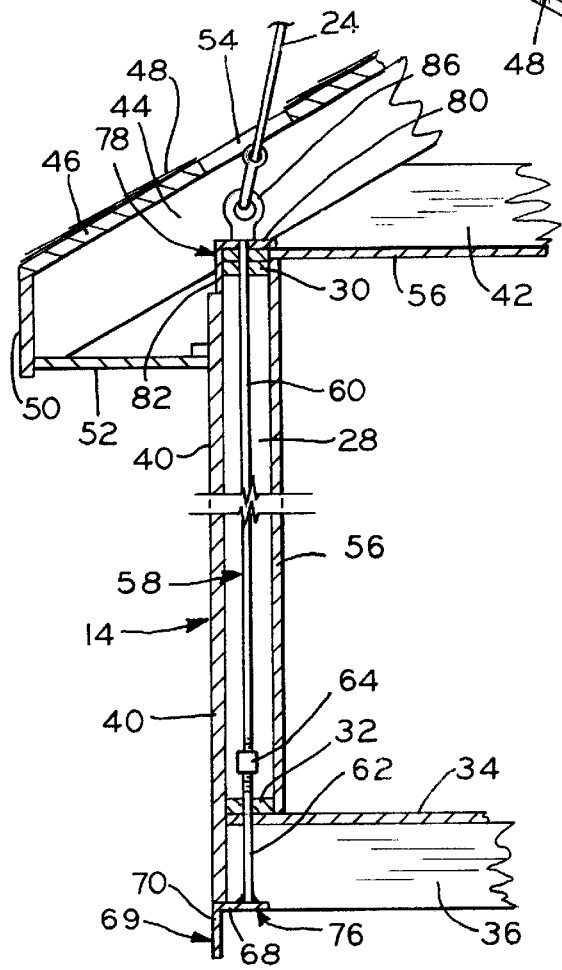
FIG. 2 is a cross-sectional view of the apparatus in the exterior wall of the building shown in FIG. 1 and taken generally along line 2—2 therein.

Referring now more particularly to FIGS. 2 and 3, apparatus 10 are placed in or incorporated into the walls 14 which are constructed with 2×4 or 2×6 inch vertical studs 28, upper plates 30 and lower plates 32. Building 12 is further constructed general similar to other "stick built" wood structures and includes plywood flooring 34 over the floor joists 36. An outer band member 38 may be incorporated at the ends of the floor joists 36 as shown in FIG. 3 or, in the alternative, can be eliminated and the sheathing 40 merely extended for covering the ends of the floor joists 36. Ceiling joists 42 rest on the upper plates 30 and, when a roof is placed on building 12 at the manufacturing facility as depicted in the drawings, rafters 44 are attached to and extend at an angle from the upper plates so as to form the slopping roof 18. Roof 18 is formed in a known and customary manner, for example, as shown using roof sheathing 46 covered with shingles 48. Facia piece 50 and soffit 52 are also provided for forming the eave as shown. In the embodiment shown in FIGS. 1 and 2, a hole 54 is provided through roof sheathing 46 for accessing the apparatus 10 with cables 24. After transporting and placing the building 12 on a foundation, as more fully described hereinbelow, cables 24 are removed and holes 54 filled and shingles placed thereover as needed for eliminating the hole.

As shown, studs 28, plates 30 and 32, floor joists 36, ceiling joists 42, rafters 44, sheathing 40 and 46 as well as flooring 34, facia 50 and soffit 52 are typically made of wood. It is noted however that some or all of these building elements can be made of other materials such as steel. For example, steel studs, plates, joists and rafters could just as easily be used in the construction of building 12. Further, the spacing of the studs 28, joists 36 and 42 and rafters 44 can be centered 16 inches or 24 inches from one another depending on the designer's criteria. As shown in FIG. 2, the building wall 14 and the underside of ceiling joists 42 are covered with drywall sheathing 56 which has been attached, taped and finished in known and customary manner. Insulation is also placed within the wall, floor and ceiling cavities (not shown), also in a known customary manner and as desired.

Apparatus 10 includes an elongate member 58 preferably made of threaded steel rod greater than ½ inch in diameter. Yet more preferably, elongate member 58 is made of an upper rod 60, lower rod 62 and a coupling 64 adapted to threadingly engage and secure together the upper and lower rods 60 and 62. Lower rod 62 is attached to the lower beam 66 also made of steel. Preferably, lower beam 66 is a steel angle as shown having a horizontal leg 68 and a vertical leg 70. Lower rod 62 is attached to the horizontal leg 68 by welding or other suitable means and so as to extend generally perpendicular therefrom. A plurality of holes 72 extend through the vertical leg 70 and are adapted to receive a fastener such as a screw or bolt 74. As best seen in FIG. 2, a notch 76 is provided at the end of each floor joist 36 for receiving the horizontal leg 68 of angle 66 and placing the lower surface 67 of horizontal leg 68 coplanar with the lower surface or edge of floor joists 36. Additionally, notch 76 is adapted for the placement of angle 66 such that the outer surface 69 of the vertical leg 70 is generally coplanar with the outer surface of sheathing 40.

An upper beam 78 is also provided and is preferably a steel angle having a horizontal leg 80 and vertical leg 82. As best seen in FIG. 2, angle 78 is positioned for placing the horizontal leg 80 over or on top of plate 30 and the vertical leg 82 on the outside of plate 30 and generally parallel with vertical studs 28. A hole 84 is provided and extends through horizontal leg 80 and is sized for receiving rod 60 therethrough. A lift member preferably in the form of an eyelet 86 is provided over and attached to angle 78 and/or threaded rod 60 and is adapted for securing a cable 24 thereto and lifting the building 12. Preferably, eyelet 86 is made of steel and, as shown, includes a threaded bore 88 adapted to threadingly receive the upper end of threaded rod 60.

For placement of apparatus 10 in the exterior wall 14, aligned holes 90 and 92 are made through respective upper and lower plates 30 and 32. Lower angle 66 and threaded rod 62 are placed in position from the underside of floor joists 36 placing leg 68 in notches 76 and rod 62 extending up through hole 92. Coupling 64 is then threaded onto the upper end of lower rod 62 and the upper rod 60 is inserted through hole 90 and threaded down into the top of coupling 64. Upper angle 78 is then placed over the top plate 30 as shown in FIG. 2 with the threaded upper rod 60 extending through hole 84 in leg 80. Eyelet 86 is then placed over the upper end of threaded rod 60 and turned for causing the upper end of rod 60 to be threadingly received into the bore 88 thereof. As can now be appreciated, by turning eyelet 86, elongate member 58 is tightened or placed in tension thereby compressing or forcing together the upper plate 30, studs 28, lower plate 32 and floor joists 36.

It is noted that angles 78 are cut in length so as to fit between rafters 44 and are thus typically 14½ inches long for 16 inch centered rafters or 22½ inches long for 24 inch centered rafters. Lower angles 66 are preferably also the same length as the upper angles 78, although it is contemplated that the lower angle 66 can be longer or even the entire length of the building wall 14. Additionally, although the use of a coupling 64 is preferred for more easily placing elongate member 58 within the wall 14 as described hereinabove, it is also contemplated that elongate member 58 can be a single unitary rod either fully threaded or only threaded at its upper end and used in the same fashion within wall 14 as described hereinabove.

For use in transporting a building 12, after a building 12 is manufactured in a manufacturing facility with a plurality of apparatus 10 incorporated in the exterior walls 14 thereof, one or more cables 24 are attached to the lift elements 85. It is noted that, if needed, steel beams (not shown) can also be provided above and parallel with the ceiling joists 42 and detachably attached to eyelets 86 at their ends for providing additional stability between the opposing exterior walls 14. Such beams would be used during transport and detached and removed after placement of the building on a foundation. Thereafter, with one or more crane hooks 26, the building 12 is lifted and placed onto a transporting vehicle which is preferably a trailer 20. Trailer 20 is diagrammatically depicted and a rear view thereof is shown in FIG. 5 wherein wheels 94 are rotatably mounted on an axle 96 supporting a trailer flat bed 98. Outriggers 100 are pivotably attached on the sides 101 of trailer bed 98 and are adapted to selectively pivot about vertical axes 102. Outriggers 100 are thus pivotable between a position generally parallel with the sides 101 of the trailer bed 98 and a position perpendicular to the sides 101 as shown in FIG. 5 whereby the effective width of the trailer bed 98 is increased to a width generally equivalent to the width of the building 12.

After lifting building 12 as shown in FIG. 1, it is placed on the trailer bed 98 as shown in FIG. 5 with the lower steel angles 66 of apparatus 10 being located such that the vertical leg 70 thereof is on the outside of and generally aligned with ears 104 located at the ends of outriggers 100. Ears 104 are provided with holes which are aligned with holes 72 of vertical legs 70. Bolts 74 are provided and extend therethrough and are secured with a nut 106 for thereby securing or fastening the apparatus 10 and building 12 onto the trailer 20. As can be appreciated, because apparatus 10 extends up through the vertical walls 14 and retains the wall elements in compression, building 12 is effectively and rigidly secured onto the trailer 20. Additionally, because the elements of walls 14 are retained in compression, building 12 can effectively withstand vibrations and other forces experienced during transport to a desired location, thereby decreasing or effectively eliminating the potential damage to the drywall 56 and other portions of the building 12.

Outriggers 100 as described hereinabove are preferred for transporting larger width buildings so that, although the effective trailer bed size is increased when transporting a building 12, the trailer width can be decreased for traveling at higher speeds when the trailer 20 is being returned to the manufacturing facility. It is contemplated, however, with respect to smaller width buildings, that outriggers 100 need not be used and the width of the trailer bed 98 simply made such that the vertical legs 70 of angles 66 fit adjacent the side edges 101 of the trailer bed 98. Bolts 74 and nuts 106 would then be used for extending through aligned holes in the trailer side edge wall 101, thereby securing the apparatus 10 and building 12 directly to the trailer bed 98.

After building 12 is transported to a desired location or site, and after the building 12 has been detached from trailer 20 by removing bolts 74, building 12 is lifted off of trailer 20 by using the apparatus lifting elements 85 and cables 24 as described hereinabove. Building 12 is then placed on a foundation 22 which was previously prepared and sized so as to receive the building 12. Preferably, foundation 22 is made of concrete or cinder blocks and includes footers 108 extending to a desired depth into the ground and having an outer wall 110 and upper surface 112. Foundation 22 may include a concrete slab 112 for additional support of the floor joists 36 and/or in the event the floor joists 36 are eliminated all together. A plurality of bores 114 are provided into the foundation footers 108 extending through the outer wall 110 and located so as to be aligned with the holes 72 of steel angle vertical leg 70. Thus, after lifting building 12 off of trailer 20, it is placed on the foundation 22 with the lower surface 67 of the lower angle horizontal leg 68 resting on top of the surface 112 of footer 108. Additionally, the inner surface 113 of the angle vertical wall 70 is located generally adjacent the foundation outer wall 110 and, thus, the building is effectively secured laterally and prevented from being moved horizontally off of the foundation. Further yet, screws or bolts 74 are inserted and secured through the holes 72 of angle vertical legs 70 and into the aligned bores 114. In this manner, building 12 is also effectively secured to the foundation preventing the possibility that the building 12 could be lifted generally vertically upwardly by severe weather and winds.

Finally, after securing to the foundation 22, building 12 is finished as may be desired. For example, siding 116 is placed in a manner whereby angles 66 and bolts 74 are hidden from view. Additionally, cables 24 are detached from eyelets 86 and with the eyelets remaining in place as shown in FIG. 6, the holes 54 through the roof sheathing 46 are filled and covered with shingles thereby hiding the hole from view and preventing potential water damage. As can be appreciated, because apparatus 10 retains the elements of the outer wall 14 in compression and is secured to the foundation 22, building 12 can withstand fairly severe weather and winds.

In another embodiment depicted in FIG. 4, the ends of the rafters 44 and roof sheathing 46 are cut along line 118 but are hingedly secured with a length of sheet metal 120. In this manner, the portion of the rafters, roof sheathing and the facia board 50 are pivotable, as shown in long short dashed lines, up and over the roof. This effectively decreases the overall width of the building 12 for meeting Federal and State maximum width requirements while on public streets and highways. In this embodiment, the hole 54 also extends through the sheet metal 120 for allowing access to eyelet 86.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An apparatus for lifting a building having walls made of vertical studs and horizontal upper and lower plates and for securing the building to a foundation having an outer wall, said apparatus comprising:
   a plurality of elongate members extending vertically through one or more of the building walls;
   a plurality of lower beams each attached to one or more elongate members and located generally below the lower wall plate;
   a plurality of upper beams each attached to one or more elongate members and located generally above the upper wall plate;
   a lift element attached to at least one of said elongate members or upper beams whereby said building may be lifted;
   said lower beam having a leg extending adjacent the foundation outer wall; and,
   a fastener attaching said lower beam leg to said foundation outer wall.

2. The apparatus of claim 1 wherein said lift elements are eyelets attached to said elongate members.

3. The apparatus of claim 1 wherein said beams are steel angles having two legs, one leg being generally parallel with said plates and the other being generally parallel with said building wall.

4. The apparatus of claim 3 wherein said fasteners are screws extending through holes in said lower beam leg and aligned bores in the foundation wall.

5. The apparatus of claim 3 further comprising means for placing said elongate members in tension and forcing said upper and lower plates toward said wall studs.

6. The apparatus of claim 1 wherein said elongate members extend vertically through one or more of the building exterior walls.

7. The apparatus of claim 1 further comprising means for placing said elongate members in tension and forcing said upper and lower plates toward said wall studs.

8. An apparatus for lifting a building having walls made of vertical studs and horizontal upper and lower plates, said apparatus comprising:
   a plurality of elongate members extending vertically through one or more of the building walls;
   a plurality of lower beams each attached to one or more elongate members and located generally below the lower wall plate;
   a plurality of upper beams each attached to one or more elongate members and located generally above the upper wall plate; and,
   a lift element attached to at least one of said elongate members whereby said building may be lifted.

9. The apparatus of claim 8 wherein said beams are steel angles having two legs, one leg being generally parallel with said plates and the other being generally parallel with said building wall.

10. The apparatus of claim 8 further comprising means for placing said elongate members in tension and forcing said upper and lower plates toward said wall studs.

11. The apparatus of claim 8 wherein said lift elements are eyelets attached to said elongate members.

12. The apparatus of claim 8 wherein said elongate members extend vertically through one or more of the building exterior walls.

13. A method of transporting a building having walls made of vertical studs and horizontal upper and lower plates to a foundation having an outer wall using an apparatus including elongate members extending vertically through one or more of the building walls, a plurality of lower beams attached to one or more elongate members and located generally vertically below the lower plate, a plurality of upper beams attached to one or more elongate members and located generally above the upper wall plate, a lift element attached to at least one of said elongate members, said method of transporting comprising steps of:

lifting said building from said lift elements and placing the building onto a transporting vehicle;

transporting said building with said vehicle to a desired location; and, lifting said building from said lift elements off of said vehicle and placing the building onto a foundation.

14. The method of claim 13 wherein, after placing the building onto a foundation, a plurality of lower beams are fastened to the foundation.

15. The method of claim 14 wherein the lower beams are fastened to a vertical wall of the foundation with fasteners extending through a beam leg.

16. The method of claim 13 wherein, after the step of placing the building onto a transporting vehicle, a plurality of the lower beams are fastened to the vehicle.

17. The method of claim 16 wherein the lower beams are fastened to pivotable outriggers on to the transporting vehicle.

18. The method of claim 17 wherein the lower beam is a steel angle having two legs, one leg being generally parallel with said lower plate and the other parallel with said building wall wherein, during the step of fastening to a vehicle, a fastener is extended through a hole of an angle leg and affixed to an outrigger.

19. The method of claim 10 wherein, after placing the building onto a foundation, a plurality of lower beams are fastened to the foundation.

20. The method of claim 19 wherein, prior to the step of lifting and placing the building onto a transporting vehicle, one or more elongate members are placed in tension forcing the upper and lower plates toward the wall studs.

21. The method of claim 13 wherein, prior to the step of lifting and placing the building onto a transporting vehicle, one or more elongate members are placed in tension forcing the upper and lower plates toward the wall studs.

22. The method of claim 21 wherein, after placing the building onto a foundation, a plurality of lower beams are fastened to the foundation.

23. The method of claim 21 wherein, after the step of placing the building onto a transporting vehicle, a plurality of the lower beams are fastened to the vehicle.

* * * * *